FIG. 5a 3,719,519
PROCESS OF FORMING PROTECTIVE COATINGS ON METALLIC SURFACES BY SPRAYING A COMBINATION OF POWDERS OF A METAL ALLOY, CHROMIUM AND A CERAMIC OXIDE
Giancarlo Perugini, 11 Via Giacomo Leopardi, Merano, Italy
Continuation-in-part of abandoned application Ser. No. 570,283, Aug. 4, 1966. This application Oct. 23, 1970, Ser. No. 83,592
Claims priority, application Italy, Aug. 6, 1965, 17,797/65
Int. Cl. B44d 1/16; C23c 7/00
U.S. Cl. 117—71 M            18 Claims

ABSTRACT OF THE DISCLOSURE

Described is a protective treatment as antioxidant barrier and as heat barrier for ferrous and non-ferrous metallic surfaces. The treatment comprises spray depositing in a molten state a combination of powders of three components comprising a metal alloy A, a metal B, and a metal oxide C onto the base surface.

---

The present application is a continuation-in-part of application Ser. No. 570,283, filed Aug. 4, 1966 and now abandoned.

The present invention relates to a combination of powders of (a) a metal alloy of the type for strong brazing, (b) a refractory metal, and (c) a ceramic oxide, in a process of their application to provide coatings protective against thermal oxidation, against thermal wear and heat penetration. More particularly, the invention relates to the combined use of said powders by spray-deposition, to provide protective coatings in one or more layers.

There exists the continuing industrial problem of furnishing of materials able to resist heat oxidation and thermal yielding (melting), for use as heat-resistant materials in the construction of: cracking chambers, jet engines, gas turbine blades, expansion nozzles, ogives and various elements of missiles. Because of the particularly severe thermal conditions of such utilizations, even the most resistant of the materials known and employed up to now, e.g. tungsten carbide alloyed with cobalt, do not give really satisfactory results.

On the other hand, application of protective coatings of highly refractory materials, such as aluminum oxide, zirconium oxide, and magnesium oxide, by spray techniques nearly always give unsatisfactory results. This is because the coatings peel off, as a result of detaching tensions ensuing from incompatibility in the expansion coefficients of the base materials and the coatings. Another reason for unsatisfactory results of the protective coatings is the porosity of the coatings applied. The porosity generally varies between 5 and 10% of the volume and permits diffusion of the corrosive gases which alter the characteristics of adhesion of the coating to the metallic base, further resulting in the peeling off of said coating.

Applicant has determined that the principal problems to the use of protective techniques are:

(1) Combining with a mechanical adhesion, elements from interactions of chemicophysical nature.

(2) Eliminating gaseous permeability by minimizing the porosity.

(3) Gradually changing the nature of the coating from the metallic base layers to the (ceramic) surface layers, preserving in the intermediate ceramic metallic and in the base metallic coatings a certain degree of impermeable porosity (with closed pores), such that the porosity absorbs the expansion phenomena of the layers of ceramic metallic and of metallic character, harmonizing them with those of the ceramic surface layers.

The object of this invention is to present a solution of the above-mentioned problems. Applicant sought for and found three components, A, B and C (an alloy with a melting point from 800–1350° C., a refractory metal with a melting point not lower than 1800° C. and a ceramic oxide with a melting point not lower than 1900° C.), presenting associative compatibility for the obtainment of coatings using spray techniques in the molten state, of ternary mixtures of the powders of the components, of binary mixtures, and of individual components which can be coupled one to another, in such a way that all three components are present in the totality of the deposited coatings.

By "associative compatibility" and by "ability to be coupled" are meant the characteristics of joinability, by means of a mechanical bond sensibly improved by interactions of chemicophysical nature among the components, both in the mass of the layers themselves (of ternary or binary composition) and in the interface between the various layers (both simple and composite) forming the protective coating. By "simple coatings" are meant those obtained by means of depositions of a sole component. "Composite coatings" are those obtained by deposition of a binary or ternary mixture of the components A, B and C.

Applicant has found, regarding the adhesion among the components A, B, and C, both in the interfacial surface of the simple and composite layers, and in the mass of the composite layers to the metallic base element: a metal alloy A, with a melting point between 800 and 1350° C., able to bind itself to the metallic base surface with a mechanical bond reinforced and strengthened by chemicophysical bonds, which occur during the application by spraying of the coating and/or during the working phase of the treated element; a refractory metal B, with a melting point not lower than 1800° C., able to bind itself with the surfaces of the granules both of component A and of component C (ceramic oxide with a melting point not lower than 1900° C.) by means of a bond reinforced and strengthened by the chemicophysical bonds occurring during the application by spraying and/or during the working phase of the treated element.

Another feature of the present invention is the superficial oxidation of the granules of the refractory metal B to eliminate by clogging, the permeable porosity and to give a structure of ceramic metallic character to the outer layers of the coating. This favors the gradual passage to the ceramic character of the covering layer consisting of component C, with consequent increase of the resistance of the total coating to gaseous diffusion with corrosive action and to the heat wear of the surface.

The invention, therefore, is expressed in the following terms: the possibility has been found to combine a metal alloy (with a melting point between 800 and 1350° C.), symbolically indicated by A, a refractory metal (with a melting point not lower than 1800° C.) symbolically indicated by B, and a ceramic oxide (with a melting point not lower than 1900° C.) symbolically represented by C, for the obtainment of protective coatings on ferrous and non-ferrous metallic surfaces. The coatings consisting of one or more qualitative layers are applied by means of the spray technique with chemical or electric flame, preferably by means of a spray gun with plasma jet. Mixtures of the powders of the components, both of ternary and of binary type, or having one simple component, are utilized so that in the coating carried out with deposition of one or more qualitative layers all three of the components A, B and C are present. A is an alloy for strong brazing, such as: Cu-Zn, Cu-Ni, Cu-Zn-Ni, Ni-Cr, and preferably nickel-chromium-iron-boron-silicon. B is a refractory metal and consists of chromium; C is an oxide selected from the group of the simple or composite refractory oxides, such as the oxides of thorium $ThO_2$, of magnesium MgO, of zirconium, $ZrO_2$, of aluminum $Al_2O_3$, zirconium silicate $ZrSiO_4$, calcium zirconate $CaZrO_3$, spinel $MgO \cdot Al_2O_3$ and preferably consists of $Al_2O_3$ or $ZrO_2$, or of layers of the latter two in any order.

The modalities for realization of the invention differ according to the various combinations of the number of the components present in each layer, and the number of the layers of which the protective coating consists. The various modalities for realization of the invention are reflected in the following general conditions for the various alternatives.

Treatment in one layer: the layer is of the composite ternary type, and is produced from a ternary mixture of the components A, B and C.

Treatment in two layers: the first layer (that adhering to the surface of the base element to be protected) is produced from the sole component A, or from a binary mixture AB, or from a ternary mixture ABC, whereby the first layer contains the component A. The second layer is produced from the sole component C, or from a binary mixture BC, or from a ternary mixture ABC, whereby the second layer contains the component C. The component B is present in the first layer, in the second layer, or in both.

Treatment in three layers: the first layer is produced according to what was said for the preceding treatment in two layers. The second layer is produced from the sole component B, from a binary mixture AB or BC, or from a ternary mixture ABC, whereby the second layer contains the component B, the third layer is produced from the sole component C or from a binary mixture BC, whereby the third layer contains the presence of the component C.

Treatment in four layers: the first layer is produced from the sole component A; the second layer is produced from the sole component B; from a binary mixture AB, or from a ternary mixture ABC, whereby the second layer contains the component B. The third layer is produced from the sole component B, or from a binary mixture BC, whereby the third layer contains the component B, alone or combined with component C and the fourth layer is produced from the sole component C.

It is to be understood that, as regards the treatments with more than one layer, wherein the last layer consists of the sole component C, it can contain only one, or more than one oxide, in the form of stratified films of one component, and preferably consists of $Al_2O_3$ on $ZrO_2$ or vice versa.

The general characteristics of the invention for the treatments in one or more layers are schematically summed up in the Tables I-IV, while the various modalities for realization of the invention are presented in examples with 23 variations schematically reported in Tables I-IV, in which the treatments with one, two, three and four layers are respectively grouped.

All the treatments according to the present invention result from deposition of the powders of the components A, B and C, individually or in ternary mixtures of a composition containing, by weight, between 60–10% for A, 20–60% for B, 20–30% for C, and preferably: 25% of A, 50% of B, and 25% of C. In the binary mixture AB a composition is used comprising between 40–90%, by weight for B and preferably: 50% of A and 50% of B, or 30% of A and 70% of B. In the binary mixture BC a composition is used comprising between 30–70% for B and between 70–30% for C, by weight, and preferably 50% of B and 50% of C.

The components A, B and C can be employed in the form of wire (when it concerns metals or alloys, components A, B) or of sintered rods (for any component A, B or C) using the spray technique in the molten state, which is known "per se," instead of powders. However, for brevity only powders, which is the preferred form, will be discussed but it is to be understood that, where this term is used in the specification, the corresponding variation using wire or sintered rod is also contemplated within the purview of the present invention.

The treatments of the invention are further characterized by the fact that, in the deposition of the layers, from one to four, one on another, the thickness of each of said layers is between 0.05–0.2 mm., preferably 0.1 mm., for the layer carried out with the use of the sole component A, between 0.05–1.0 mm., preferably 0.15 mm., for the layer carried out with the use of the sole component B, between 0.05–1.0 mm., preferably 0.05, 0.2 or 0.7 mm., according to the cases, for the layer carried out with the use of the sole component C, between 0.05–0.5 mm., preferably 0.20 mm., for the layer carried out with the use of the ternary mixture ABC, between 0.05–0.4 mm., preferably 0.15 mm., for the layer carried out with the use of the binary mixture AB, between 0.05–0.5 mm., preferably 0.25 mm., for the layer carried out with the use of the binary mixture BC.

The powders of the components A, B and C are employed with a granulometry between −120 and +600 mesh, and preferably between −230 and +325 mesh.

In the above exposed pattern, the metal alloy A creates a strong bond with the metallic base surface, roughened by a preliminary sandblasting, by means of a mechanical bond reinforced and strengthened by means of the occurrence of chemicophysical bonds, which takes place during the application by spraying of the coating and/or during the working phase of the treated element. The refractory metal B creates a firm bond with the surface of the granules both of the component A and of the component C, by means of a mechanical bond reinforced and strengthened by the occurrence of chemicophysical bonds, which takes place during the application by spraying and/or during the phase of thermal working of the treated element.

Figure 1:
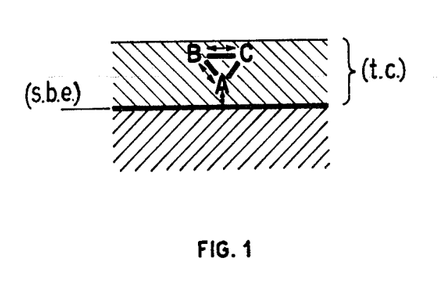
FIGS. 1 to 5 of the attached drawings show in schematic form, some of the possible realization modalities of the invention, in relation to which herebelow specific demonstrative examples will be given.
Figure 1A:
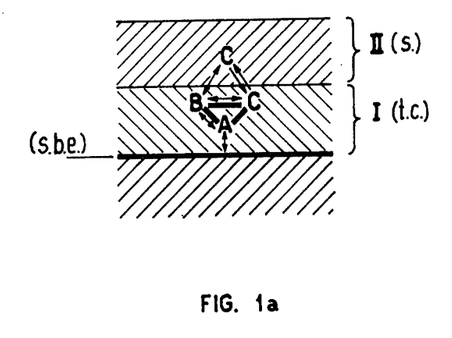

FIG. 1 graphically and in schematic form, represents the protective treatment called by applicant "Secrometossidal," according to two versions: FIG. 1, suitable for protective coatings as antioxidant barriers; FIG. 1a, suitable for protective coatings as heat and antioxidant barrier. The difference between the two versions consists in the fact that in FIG. 1a, a covering layer (second simple layer) consisting of a single ceramic oxide, is applied.

In both versions, the treatment consists in the spray-deposition (with a chemical or electric flame, and preferably by means of a plasma jet) of a composite ternary layer, to a thickness comprised between 0.05–0.5 mm. (preferably 0.25 mm.) from a ternary mixture of powders with a granulometry comprised between −120 and +600 mesh (preferably between −230 and +325 mesh) and containing 10–60%, by weight, of a nickel-chromium-iron-boron-silicon alloy, having a melting point between 800 and 1350° C. (preferably 25% by weight of alloy having the composition 0.4–1.0% of C; 0.9–5.0% of Fe; 2.1–4.4% of Si; 1.0–4.1% of B; 9.0–27.0% of Cr, the remainder to 100% Ni, together with occasional other metals in very small amounts and having a melting point of about 1040–1100° C.), 60–20% by weight or chromium (preferably 50% by weight of chromium), 30–20% by weight of alumina (preferably 25% by weight of $Al_2O_3$-α).

As indicated above, when using the protective coating as "heat barrier" the treatment is completed with a second simple layer (between 0.1–1.0 mm. thick) consisting of the and/or composite layers, all three of the components are present) are indicated by Tables I to IV.

The following examples are presented for the purpose of exemplification, but not to limit the various possible realization of modalities of the invention.

It is seen from these examples that the invention is efficaciously suitable for the protection of metallic surfaces of iron, brass, aluminum, Incoloy-DS (C 0.15% max.+Mn 0.9 to 1.3%+Si 2 to 2.5%+Cu 0.25% max.+Ni 36 to 39%+Co 17 to 19%+balance of 100%=Fe), etc., i.e. of ferrous and non-ferrous metallic surfaces, both with applications of the antioxidant barrier type, and of the heat barrier type.

EXAMPLE 1 (ON IRON TEST PIECE)—EXAMPLE 2 (ON BRASS TEST PIECE)

Application of the protective treatment

Onto one side of each test piece of flat, rectangular shape and of the dimensions of 65 x 50 x 4 mm., has been applied, after previous pretreatment of sandblasting, by the spray technique, using a spray gun with a plasma jet, operated with argon plasma with a power of 14 kw., the "Secrometossidal" treatment with a single, composite, ternary layer, having a thickness of about 0.2 mm., from a starting mixture of the powders containing 25% of nickel-chromium-iron-boron-silicon alloy (consisting essentially of 0.5% of C; 2.5% of Fe; 4.0% of Si; 4.0% of B; 15.0% of Cr, the rest up to 100% consisting of nickel together with traces of other metals), 50% of chromium and 25%, by weight, of $Al_2O_3$-α, and in the granulometric fraction comprised between —230 and +325 mesh, injected into the plasma jet by means of transport by nitrogen blowing.

Testing against heat oxidation under homogeneous heating conditions in a muffle furnace After the protective treatment had been applied the metallic test pieces were placed into a muffle furnace, in air atmosphere, at a temperature of 800° C., and kept there for 150 hours.

After extraction from the muffle, it was observed that the applied coating to each cold test piece had very good characteristics of resistance to heat oxidation, that the coating had remained perfectly anchored to the base surface, which, consequently remained perfectly protected. The surface of the base metal on the opposite non-protected side had undergone a strong corrosion by heat oxidation.

Result

Positive results for both test pieces 1 and 2 were achieved showing suitability of the applied treatment for the protection of iron and of brass against heat oxidation.

EXAMPLE 3 (IRON TEST PIECE)—EXAMPLE 4 (BRASS TEST PIECE)

Application of the protective treatment

To one side of each test piece of flat, rectangular shape having the dimensions of 65 x 50 x 4 mm., has been applied, after previous pretreatment of sandblasting, by the spray technique carried out with the use of a spray gun with plasma jet, operated with argon plasma with a power of 15–19 kw., the Sede-Cromalox treatment with two layers, of which the first (simple) one, having a thickness of about 0.1 mm. was obtained using powders of the sole nickel-chromium-iron-boron-silicon alloy, having the composition given in Examples 1–2, in the granulometric fraction comprised between —140 and +325 mesh, and the second (composite) layer, having a thickness of about 0.15 mm. has been obtained using a mixture of powders containing 50% of chromium and 50% by weight of $Al_2O_3$-α type, in a granulometric fraction comprised between —325 and +600 mesh. In each case, the powders were injected into the plasma jet by nitrogen blowing.

Testing against heat oxidation under homogeneous heating conditions in a muffle

Afetr the protective treatment had been applied, the metallic test pieces were placed into a muffle, in air atmosphere, at a temperature of 850° C., and kept there for 120 hours (Example 3) and 100 hours (Example 4).

After extraction from the muffle, it was observed that the applied coating on each cold test piece had very good characteristics of resistance to heat oxidation, that it had remained perfectly anchored to the base surface, perfectly protecting the latter, while on the opposite side, the surface of the base metal showed the consequences of a strong corrosion by heat oxidation.

Result

Positive results for both test pieces 3 and 4 with suitability of the applied treatment for the protection of iron and brass against heat oxidation.

EXAMPLE 5 (IRON TEST PIECE WITH CERAMIC COVERING LAYER CONSISTING OF $Al_2O_3$)

EXAMPLE 6 (IRON TEST PIECE WITH CERAMIC COVERING LAYER CONSISTING OF $ZrO_2$)

Application of the protective treatment

To one side of each flat, rectangular iron test piece, having the dimensions of 65 x 50 x 4 mm., has been applied, after previous sandblasting treatment, by the spray technique carried out using a spray gun with plasma jet, operated with argon plasma with a power of 15–19 kw., the Secromet-Oxid treatment with two layers, of which the first one (composite binary), of a thickness of about 0.15 mm., had been obtained using a mixture of powders containing 30% of nickel-chromium-iron-boron-silicon alloy (having the composition given in Examples 1–2) and 70% by weight of chromium, in the granulometric fraction comprised between —200 and +325 mesh. The second covering layer, on test piece 5, consisted of a layer of a thickness of about 0.05 mm. of $Al_2O_3$ had been applied, using a granulometric fraction comprised between —325 and +600 mesh, while on test piece 6 an equal thickness of $ZrO_2$ had been applied using a stabilized product (with about 5% of CaO) of the same granulometric fraction.

In each case the powders have been injected into the plasma jet by means of transport by nitrogen blowing.

Testing against heat oxidation under homogeneous heating conditions in a muffle

After application of the protective treatment, the metallic test pieces were inserted into a muffle furnace, in air atmosphere, at a temperature of 850° C., and kept there for 300 hours. After extraction from the muffle, it was observed, that the applied coating on each cold test piece had very good characteristics of resistance to heat oxidation, that it had remained perfectly anchored to the base surface, efficaciously protecting the latter, while the surface of the base metal, on the opposite side, showed the consequences of a strong corrosion by heat oxidation.

Result

Positive results for both test pieces 5 and 6 with suitability of the applied treatment for the protection of iron from heat oxidation.

EXAMPLE 7

Application of protective treatment

To one side of a flat, rectangular iron test piece of 65 x 50 x 4 mm., has been applied, after previous sandblasting treatment, by the spray technique carried out with a spray gun with plasma jet, operated with argon plasma with a power of 13 kw., the Secromet-Oxid treatment with three layers, of which:

The first (composite binary one) of a thickness of about 0.1 mm., was obtained using a mixture of powders ceramic oxide only (preferably stabilized zirconium oxide containing about 5% of CaO or of BaO), from a powder having a granulometry comprised between −120 and +600 mesh (preferably between −230 and +325 mesh). Alternatively, this second layer, of ceramic character, can be attained using more than one oxide, in the form of stratified films of one component, preferably consisting of $Al_2O_3$ on $ZrO_2$ or vice versa.

Figure 2:
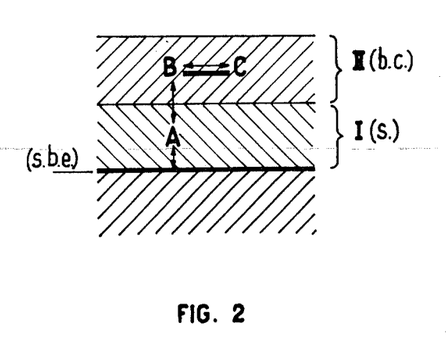

FIG. 2 graphically and schematically represents the protective treatment called by applicant "Sede Cromalox," according to two versions: FIG. 2 and FIG. 2a, for applications as antioxidant barriers and as heat barriers, respectively. The difference between the two versions consisting in the fact that in FIG. 2a, a covering layer (III simple layer) is applied consisting of a sole ceramic oxide.

The treatment, for both versions, consists in the spray-deposition (with chemical or electric flame, preferably by means of a spray gun with plasma jet) of a first simple layer, up to a thickness comprised between 0.05 and 0.2 mm. (preferably 0.1 mm.) starting from powders having a granulometry comprised between −120 and +600 mesh (preferably between −230 and +325 mesh) consisting of a sole nickel-chromium-iron-boron-silicon alloy, having a melting point between 800 and 1350° C. (preferably having the composition 0.4–1.0% of C; 0.9–5.9% of Fe; 2.1–4.4% of Si; 1.9–4.1% of B; 9.0–27.0% of Cr, the rest up to 100% consisting of nickel together with occasional other metals in very small amounts and having a melting point of about 1040–1100° C.). This is followed with a second composite binary layer, to a thickness between 0.05–0.5 mm. (preferably 0.25 mm.) starting from a binary mixture of powders having a granulometry comprised between −120 and +600 mesh (preferably between −230 and +325 mesh) and containing 30–70% by weight of chromium (preferably 50% by weight of chromium) and 70–30% by weight of alumina (preferably 50% by weight of $Al_2O_3$-α).

As said above, when using the protective coating as "heat barrier" the treatment is completed with a third simple layer, up to a thickness comprised between 0.1 and 1.0 mm., consisting of a sole simple or composite ceramic oxide (preferably stabilized zirconium oxide containing about 5% of CaO or of MgO, or aluminum oxide type-α), from a powder having a granulometry between −120 and +600 mesh (preferably between −230 and +325 mesh). Alternatively, this third layer of ceramic character can also be attained using more than one oxide, in the form of stratified films of one component, preferably consisting of $Al_2O_3$ on $ZrO_2$ or vice versa.

Figure 3:
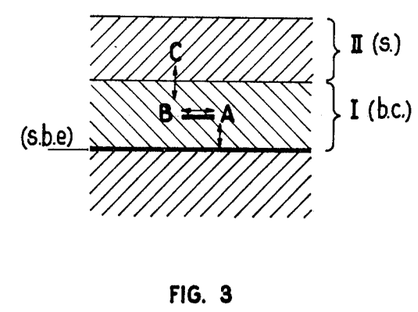
Figure 3A:
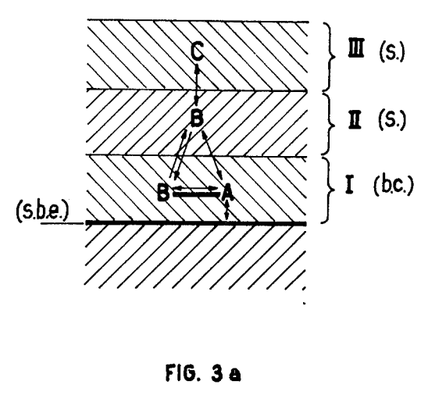

FIG. 3 graphically and schematically represents the protective treatment called by applicant "Secromet Oxid," according to two variations: FIG. 3 and FIG. 3a, for applications as antioxidant barrier and as heat barrier, respectively. The difference between the two versions is that in FIG. 3a an intermediate layer of a simple type obtained by means of deposition of the refractory metal, formed by chromium is between the surface layer (consisting of a sole ceramic oxide) and the base layer (I binary composite layer).

The treatment for both versions consists in the spray-deposition (with chemical or electric flame, preferably by means of a spray gun with plasma jet) of a first binary composite layer, up to a thickness comprised between 0.05–0.4 mm. (preferably 0.15 mm.) starting from a binary mixture of powders having a granulometry comprised between −120 and +600 mesh (preferably between −230 and +325 mesh) and containing 40–90% by weight of chromium (preferably 50% or 70% by weight of chromium) and 60–10% by weight of a nickel-chromium-iron-boron--silicon alloy, having a melting point between 800 and 1350° C. (preferably 50% or 30% by weight of alloy having the composition 0.4–1.0% of C; 0.9–5.0% of Fe; 2.1–4.4% of Si; 1.9–4.1% of B; 9.0–27.0% of Cr, the rest up to 100% consisting of nickel together with occasional other metals in very small amounts and having a melting point of about 1040–1100° C.).

In the version of the antioxidant barrier type (FIG. 3), a second simple layer is produced, up to a thickness comprised between 0.05–0.25 mm. (preferably 0.1 mm.) and consisting of a sole ceramic oxide (preferably stabilized zirconium oxide containing about 5% of CaO or BaO, or α-$Al_2O_3$), starting with the use of powder having a granulometry comprised between −120 and +600 mesh (preferably −230 and +325 mesh). Alternatively, this layer of ceramic character can also be attained using more than one oxide, in the form of stratified films of one component, preferably consisting of $Al_2O_3$ on $ZrO_2$ or vice versa.

In the version of the "heat barrier" type (FIG. 3a) a simple intermediate layer of metallic nature is formed to a thickness comprised between 0.05 and 1.0 mm. (preferably 0.15 mm.) by spray-deposition of powders having a granulometry comprised between −120 and +600 mesh (preferably between −230 and +325 mesh) consisting of the sole refractory metal chromium, between the two above-cited layers.

Figure 4:
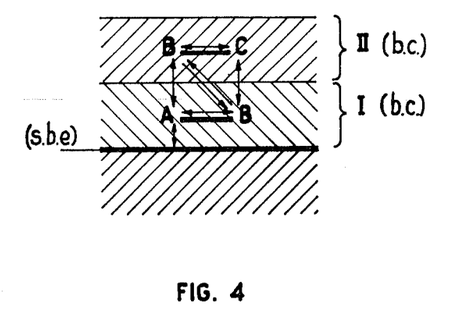
Figure 4A:
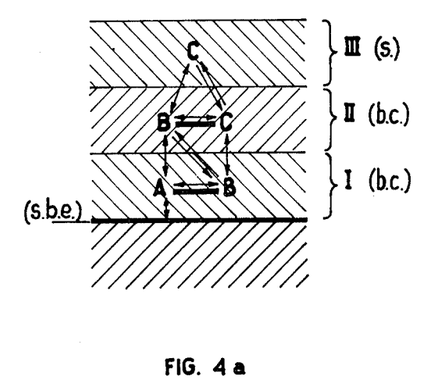

FIG. 4 is a schematic representation of the composition of one of a protective treatment by use of the components A, B and C, in ternary and/or in binary mixtures, and/or mixtures of one component, according to application in multiple layers one on another, with particularly strong interfacial adhesion, according to this invention. Alternatively, the III layer can be attained using more than one oxide in the form of stratified films of one component, preferably consisting of $Al_2O_3$ on $ZrO_2$ or vice versa (FIG. 4a).

Figure 5:
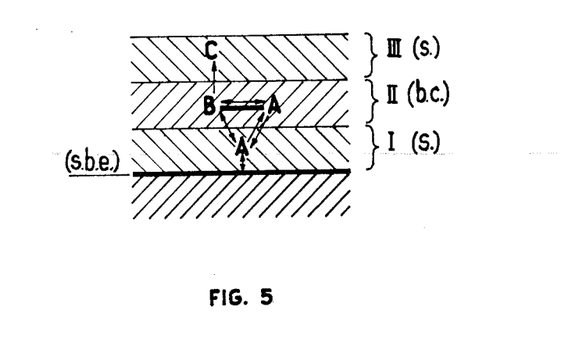
Figure 5A:
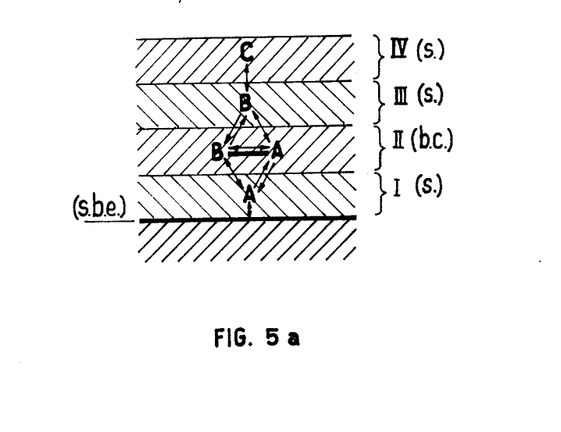

FIG. 5 is a schematic representation of the composition of the protective spray treatment of the type "Sedescromet-Oxid" using three and four layers. The III layer can be attained using more than one oxide, in the form of stratified films of one component, preferably consisting of $Al_2O_3$ on $ZrO_2$ or vice versa (FIG. 5). The IV layer can also be attained using more than one oxide, in the form of stratified films of one component, preferably consisting of $Al_2O_3$ on $ZrO_2$ or vice versa (FIG. 5a).

The symbols in FIGS. 1 and 5 are as follows:

A = metal alloy of the type for strong brazing:
B = refractory metal;
C = simple or composite ceramic oxide;
= = intergranular mechanical bond concerning the composite (ternary or binary) layer;
↔ = interfacial mechanical bond, reinforced by the occurrence of bonds of chemicophysical nature; and
⇌ = cohesive forces concerning the granules of the same component.

The Roman numerals indicate the layers:

I = first layer
II = second layer
III = third layer
IV = fourth layer

The layers in the figures are indicated to be:

(s.) = simple
(b.c.) = binary composite
(t.c.) = ternary composite
"s.b.e." = surface of the base element.

Of course, the schematic illustrations of FIGS. 1 to 5 represent only some of the possible modalities of the invention, which have been illustrated for the purpose of exemplification and not of limitation.

Other possible modalities of the invention (which consists in the utilization of components A, B and C, to achieve protective coatings on ferrous or non-ferrous metallic surfaces, by means of the spray technique with use of the powders of the components both alone and/or of their binary mixtures and/or of their ternary mixtures, in such a way that in the totality of the deposited, simple alloy (having the composition given in Examples 1-2) and 50% by weight of chromium, in a granulometric fraction comprised between −200 and +325 mesh for 71.5% of the mixture, the remainder being dispersed up to −120 mesh. The second layer (simple) of a thickness of about 0.15 mm. was obtained using only $ZrO_2$ powder (stabilized with about 5% of CaO), in the granulometric fraction comprised between −270 and +325 mesh.

In each case the powders have been injected into the plasma jet by nitrogen blowing.

Testing against facial thermal shock

The piece was tested according to Example 9. Number of cycles undergone without any damage: 20.

Result

Analogous to that obtained in Example 9.

EXAMPLE 11

Application of protective treatment

An aluminum test piece was treated as in Example 10.

Testing against localized overheating

The test is carried out in comparison with a non-protected test piece as follows:

An oxyacetylene jet (0.275 l./sec. for $C_2H_2$; 0.265 l./sec. for $O_2$ with a spout of type 1500) was played against a non-protected test piece, measuring the time from the moment the spout touches the surface of the test piece at an angle of 45° until the localized fusion occurs. For the oxyacetylene spout employed above the time was about 5 sec.

The test is repeated on the protected test piece, using the same technique, which does not cause any fusion in a number of 14 tests.

Result

The efficiency of the heat barrier applied, is given by the ratio between the number of the tests, which on the protected test piece, do not cause fusion, and the total number of the tests. This, in the example reported, was:

$$100 \frac{14}{14} = 100\%$$

and constitutes the index of the efficiency of the heat barrier applied.

EXAMPLE 12

Application of protective treatment

To the inner surface of an Incoloy-DS chamber, having the form of a truncated cone, of the dimensions diameters of the bases 200 and 250 mm., height 550 mm. of a furnace for the cracking of benzene to acetylene according to the Fauser installations, after preliminary sandblasting, the Secromet-Oxid treatment with three layers was applied by the spray technique using a spray gun with plasma jet, operated with argon plasma with a power 15–18 kw.

The first (composite binary) layer of a thickness of about 0.15 mm. was obtained using a mixture of powders containing 50% of nickel-chromium-iron-boron-silicon alloy (having the composition given in Examples 1-2) and 50% by weight of chromium, in a granulometric fraction comprised between −200 and +325 mesh for 71.5% of the mixture, the remainder being dispersed up to −120 mesh. The second (simple) one of a thickness of about 0.15 mm., was obtained using only chromium powder, in the granulometric fraction of −200/+325 mesh. The third (simple) one of a thickness of about 0.7 mm. was obtained using the sole $ZrO_2$ powder (stabilized with 5% of CaO), in the granulometric fraction comprised between −200/+325 mesh.

In each case the powders had been injected into the plasma jet by means of transport by nitrogen blowing.

Testing against thermal shock by alternated starting and stopping in industrial plant The chamber having the form of a truncated cone has been installed, after the application of the heat barrier treatment, in an idustrial plant and worked with numerous starts alternated with an equal number of stops. The chamber, which is provided with a jacket for the cooling fluid and which contains a cracking flame having a temperature of 2800° C. has, as a consequence of starts cyclically alternated with stops, a severe condition of thermal shock in its heat barrier lining.

Result

Positive. After about 6 hours of working with alternated cycles of starting and stopping of the cracking flame, it was observed that the lining had not suffered any damage and had behaved efficiently.

EXAMPLE 13

Application of protective treatment

To the inner surface of a Rheinrohr-TSL (a steel of ferritic-perlitic type comprising essentially C 0.05%+Si 0.28%+Mn 0.42%+Ti 0.46%+P 0.023%+S 0.016%+ balance to 100%=Fe), iron ring (C=0.05; Si=0.28; Mn=0.42; P=0.023; S=0.016) of the dimensions 95 mm. diameter, 40 mm. high and 3 mm. thick, after preliminary sandblasting treatment, the Secromet-Oxid treatment with three layers, was applied by means of the spray technique carried out with the use of a spray gun with plasma jet operated with argon plasma with a power of 15 kw.

The first layer (composite binary) of a thickness of about 1.25 mm. was obtained using the sole $ZrO_2$ powder containing 50% of nickel-chromium-iron-boron-silicon alloy (having the composition given in Examples 1-2) having a granulometry comprised between −120 and +270 mesh (−125μ/+50μ) and 50% by weight of chromium, in a granulometric fraction completely passing through a sieve of 200 mesh (≤75μ). The second layer (simple) of a thickness of about 0.2 mm., was obtained, using the only chromium powder in the granulometric fraction totally comprised between −200 and +230 mesh (−74/+62μ). The third layer (simple) of a thickness of about 1.25 mm. was obtained using the sole $ZrO_2$ powder (stabilized with about 5% of CaO) in the granulometric fraction totally comprised between −200 and +230 mesh (−74/+62μ).

In each case, the powders were injected into the plasma jet by means of transport by nitrogen blowing.

Testing of the mechanical resistance of the coating in homogeneous heating conditions in a muffle at 1000° C.

After the application of the protective treatment, the ring was placed into a muffle, in air atmosphere, at a temperature of 1000° C. and kept there for 100 hours. After extraction from the muffle, it has been observed that the covering had not suffered any mechanical damage (such as cracks, scalings, or partial or total detachment) and remained perfectly anchored to the base metal, which consequently was efficaciously protected. On the contrary, the outer not protected surface showed a considerable corrosion by heat oxidation.

Result

Positive results were obtained showing the suitability of the treatment to form a heat barrier as well as an antioxidant barrier, and an evident mechanical resistance to the stresses due to thermal expansion of the iron Rheinrohr-TSL base metal.

EXAMPLE 14

Application of protective treatment

The Secromet-Oxid treatment was applied, after preliminary sandblasting to the inner surface of a steel Incoloy-DS ring of the dimensions 100 mm. diameter, containing 50% of nickel-chromium-iron-boron-silicon alloy (having the composition given in Examples 1-2) and 50% by weight of chromium, in a granulometric fraction comprised between —200 and +325 mesh for 71.5% of the mixture, the remainder being dispersed up to —120 mesh.

The second (simple) layer, of a thickness of about 0.1 mm., was obtained using only chromium powder in the granulometric fraction between —200 and +325 mesh.

The third (simple) layer of the thickness of about 0.1 mm. has been obtained using the sole $ZrO_2$ powder (stabilized with about 5% of CaO), in the granulometric fraction of —270/+325 mesh.

In each case the powders were injected into the plasma jet by nitrogen blowing.

Testing against the facial thermal shock

After the application of the protective treatment, the metallic test piece was placed in front of an oxyacetylene jet (0.275 l./sec. for $C_2H_2$; 0.265 l./sec. for $O_2$ at 17° C. 746 mm. Hg) kept at a distance of 5 cm. from the surface of the test piece, until the coating was brought to incandescence. Suddenly, a strong jet of carbon anhydride was played on the surface, extinguishing the incandescence and followed by a water jet at 15° C. The hot and cold jets on the surface of the test piece were cyclically repeated. After having subjected the test piece to the thermal shock for 10 cycles, it has been observed that the protective coating had not undergone any crack and that its adhesion to the metallic base surface had not in the least suffered.

Result

Positive. The applied treatment shows to possess an excellent resistance to the stresses deriving from a sudden cyclical thermal shock, and to be able to protect iron also against said severe conditions of facial thermal cyclical shock.

EXAMPLE 8

Application of protective treatment

To one side of a flat, rectangular iron test piece of 65 x 50 x 4 mm. was applied, after previous sandblasting, by means of the spray technique carried out with the use of a spray gun with plasma jet, operated with argon plasma with a power of 16-18 kw., the Secromet-Oxid treatment with three layers, of which:

The first (composite binary) layer, of a thickness of about 0.30 mm. was obtained using a mixture of powders containing 50% of the nickel-chromium-iron-boron-silicon alloy (having the composition given in Examples 1-2) and 50% by weight of chromium, in a granulometric fraction comprised between —200 and +325 mesh for 71.5% of the mixture, the remainder being dispersed up to —120 mesh.

The second layer (simple) of a thickness of about 0.3 mm., was obtained using only chromium powder in the granulometric fraction of —200/+325 mesh.

The third layer (simple) was obtained using aluminum oxide and zirconium oxide as stratified films of one component, depositing a thickness of 0.2 mm. of $Al_2O_3$ starting from α-type $Al_2O_3$ having a granulometry between —270 and +325 mesh, and subsequently depositing on top of said layer, a thickness of 0.15 mm. of $ZrO_2$ starting with the product stabilized with about 5% of CaO of a granulometry comprised between —270 and +325 mesh.

In each case the powders were injected into the plasma jet by means of transport by nitrogen blowing.

Testing against thermal oxidation under homogeneous heating conditions in a muffle After the application of the protective treatment the metallic test piece is put into a muffle, in air atmosphere, at a temperature of 800° C. and kept there for 300 hours. After extraction from the muffle, it was observed that the applied coating on the cold test piece had very good characteristics of resistance to thermal oxidation, that it had remained perfectly anchored to the base surface, efficaciously protecting the latter, while the surface of the base metal, on the opposite side, showed the consequences of a strong corrosion by thermal oxidation.

Result

Positive results for the protective coating of heat barrier type to support the tensions determined by a strong heating and to assure an excellent protection of iron against thermal oxidation.

EXAMPLE 9

Application of protective treatment

To one side of an aluminum test piece in the form of an 80 mm. diameter disc 10 mm. thick, after previous sandblasting, the Secromet-Oxid treatment with three layers was applied, by means of the spray technique carried out with the use of a spray gun with plasma jet, operated with argon plasma with a power of 12-14 kw.

The first (composite binary) layer of a thickness of about 0.15 mm. was obtained using a mixture of powders containing 50% of the nickel-chromium-iron-boron-silicon alloy (having the composition given in Examples 1-2) and 50% by weight of chromium, in a granulometric fraction comprised between —200 and +325 mesh for 71.5% of the mixture, the remainder being dispersed up to —120 mesh.

The second (simple) layer of a thickness of about 0.10 mm. was obtained using only chromium powder, in the granulometric fraction comprised between —200 and +325 mesh.

The third (simple) layer of a thickness of about 0.15 mm. was obtained using the sole $ZrO_2$ powder (stabilized with 5% of CaO) in the granulometric fraction comprised between —270 and +325 mesh.

In each case the powders were injected into the plasma jet by means of transport by nitrogen blowing.

Testing against facial thermal shock

After the application of the protective treatment the metal test piece has been put in front of an oxyacetylene jet (0.275 l./sec. for $C_2H_2$; 0.265 l./sec. for $O_2$ at 17° C. 746 mm. Hg) kept at a distance of 5 cm. from the surface of the test piece, until the base metallic mass was brought to a temperature of 500° C., as indicated by a thermocouple inserted into a hold made in the cylindrical wall, as far as the center of the test piece. At this point, a sudden cooling was achieved by a jet of water at 15° C. The hot and cold jet were cyclically repeated on the surface of the test piece.

After having subjected the test piece to thermal shock for a number of 20 cycles, it has been observed that the protective coating had not suffered any crack and that its adhesion to the metallic base surface had not in the least suffered from it.

Result

Positive. The treatment applied for the purpose of heat barrier shows to possess a very good resistance to the stresses deriving from a sudden thermal shock and to be suitable for application onto aluminum.

EXAMPLE 10

Application of protective treatment

To one side of an aluminum test piece in the form of an 80 mm. diameter disc 10 mm. thick, after preliminary sandblasting treatment, the Secromet-Oxid treatment with two layers was applied by means of the spray technique carried out with the use of a spray gun with plasma jet, operated with argon plasma with a power of 12-14 kw.

The first layer (composite binary) of a thickness of about 0.15 mm. was obtained using a mixture of powders containing 50% of nickel-chromium-iron-boron-silicon In the protective treatments in which the last layer consists of the sole component C, this layer can be obtained using more than one oxide, in the form of stratified films of one component, preferably consisting of $Al_2O_3$ on $ZrO_2$ or vice versa.

TABLE I.—TREATMENT WITH ONE LAYER

[Obtained by deposition of the ternary mixture ABC and with statistical distribution of the components on the surface of the base element to be protected]

| Treatment number | Layer | Employments |
|---|---|---|
| 1 | ABC | An antioxidant barrier (ref. to Fig. 1). |

TABLE II.—TREATMENT WITH TWO LAYERS

| Treatment number | Layers I | Layers II | Employments |
|---|---|---|---|
| 2 | A | BC | As antioxidant barrier (ref. to Fig. 2) |
| 3 | A | ABC | As antioxidant barrier. |
| 4 | AB | BC | As antioxidant barrier (ref. to Fig. 4) |
| 5 | AB | C | As heat and antioxidant barrier (ref. to Fig. 3). |
| 6 | ABC | BC | As antioxidant barrier. |
| 7 | ABC | C | As heat and antioxidant barrier (ref. to Fig. 1a). |

NOTE.—I layer: obtained by deposition of the sole component A; or of a binary mixture AB; or of a ternary mixture ABC; II layer: obtained by deposition of the sole component C; or of a binary mixture BC; or of a ternary mixture ABC.

In the utilization of treatment numbers 6 and 7 as the "antioxidant barrier," the number of layers can be reduced to 1, avoiding the application of the II layers.

TABLE III.—TREATMENT WITH THREE LAYERS

| Treatment number | Layers I | Layers II | Layers III | Employments: as barrier |
|---|---|---|---|---|
| 8 | A | B | C | Heat and antioxidant. |
| 9 | A | AB | BC | Antioxidant. |
| 10 | A | AB | C | Heat and antioxidant. |
| 11 | A | BC | C | Heat and antioxidant (ref. to Fig. 2a). |
| 12 | A | ABC | BC | Antioxidant. |
| 13 | A | ABC | C | Heat and antioxidant. |
| 14 | AB | B | C | Heat and antioxidant (ref. to Fig. 3a). |
| 15 | AB | BC | C | Heat and antioxidant (ref. to Fig. 4a). |
| 16 | ABC | B | C | Heat and antioxidant. |
| 17 | ABC | BC | C | Do. |
| 18 | A | B | BC | Antioxidant. |

NOTE.—I layer: obtained by deposition of the sole component A; or of a binary mixture AB; or of a ternary mixture ABC; II layer: obtained by deposition of the sole component B; or of a binary mixture AB or BC; or of a ternary mixture ABC; III layer: obtained by deposition of the sole component C; or of a binary mixture BC.

In the utilization of treatments 11, 12, 13, 15, 17 as the "antioxidant barrier" the number of the layers can be reduced to 2, avoiding the application of the III layer.

TABLE IV.—TREATMENT WITH FOUR LAYERS

| Treatment number | LAYERS I | LAYERS II | LAYERS III | LAYERS IV |
|---|---|---|---|---|
| 19 | A | AB | B | C |
| 20 | A | AB | BC | C |
| 21 | A | ABC | B | C |
| 22 | A | ABC | BC | C |
| 23 | A | B | BC | C |

NOTE.—I layer: obtained by deposition of the sole component A; II layer: obtained by deposition of the binary mixture AB; or of a ternary mixture ABC; or of the sole component B; III layer: obtained by deposition of the sole component B; or of a binary mixture BC; IV layer: obtained by deposition of the sole component C; Employments: as heat and antioxidant barrier.

In the case of utilization of treatments, Nos. 20, 22, 23 as the "antioxidant barrier," the number of the layers can be reduced to 3, avoiding the application of layer IV.

SUMMARIZING TABLES OF THE EXAMPLES FROM 1 TO 17

| Example number | Form of the test piece | Base metal | Treatment applied Type number | Graphical representation, Fig. |
|---|---|---|---|---|
| 1 | Plate | Iron | 1 with one layer | 1 |
| 2 | do | Brass | do | 1 |
| 3 | do | Iron | 2 with two layers | 2 |
| 4 | do | Brass | do | 3 |
| 5 | do | Iron | 5 with two layers | 3 |
| 6 | do | do | do | 3 |
| 7 | do | do | 14 with three layers | 3a |
| 8 | do | do | do | 3a |
| 9 | Disk | Aluminum | do | 3a |
| 10 | do | do | 5 with two layers | 3 |
| 11 | do | do | do | 3 |
| 12 | Truncated cone chamber. | Incoloy-DS | 14 with three layers | 3a |
| 13 | Ring | Rheinrohr-TSL iron | do | 3a |
| 14 | do | Incoloy-DS | do | 3a |
| 15 | do | Rheinrohr-TSL iron | 19 with four layers | 5a |
| 16 | Plate | Iron | do | 5a |
| 17 | do | Rheinrohr-TSL iron | do | 5a |

TABLE

| Example number | Layers of the coatings components/thicknesses/granulometry of the powders 1st | 2d | 3d | 4th |
|---|---|---|---|---|
| 1 | ABC/0.2 mm./−230+325 mesh | | | |
| 2 | do | | | |
| 3 | A/0.1 mm./−140+325 mesh | BC/0.15 mm./−300+600 mesh | | |
| 4 | do | do | | |
| 5 | AB/0.15 mm./−200+325 mesh | C/0.05 mm./−325+600 mesh | | |
| 6 | do | do | | |
| 7 | AB/0.1 mm./−120+325 mesh | B/0.1 mm./−200+325 mesh | C/0.1 mm./−270+325 mesh | |
| 8 | AB/0.3 mm./−120+325 mesh | B/0.3 mm./−200+325 mesh | C/0.2−0.15 mm./−270+325 mesh | |
| 9 | AB/0.15 mm./−120+325 mesh | B/0.1 mm./−200+325 mesh | C/0.15 mm./−270+325 mesh | |
| 10 | do | | C/0.15 mm./−270+325 mesh | |
| 11 | do | | | |
| 12 | do | B/0.15 mm./−200+325 mesh | C/0.7 mm./−200+325 mesh | |
| 13 | AB/0.3 mm./−120+270 mesh | B/0.2 mm./−200+230 mesh | C/1.25 mm./−200+230 mesh | |
| 14 | do | do | C/1.75 mm./−200+230 mesh | |
| 15 | A/0.2 mm./−120+325 mesh | AB/0.2 mm./−120+270 mesh | B/0.2 mm./−200+230 mesh | C/1.25 mm./−200+230 mesh. |
| 16 | do | AB/0.15 mm./−120−270 mesh | B/0.15 mm./−230+270 mesh | C/0.6 mm./−200 mesh. |
| 17 | do | do | do | C/0.6 mm./−200 mesh. |

40 mm. high and 3 mm. thick by means of a spray gun with plasma jet, operated with argon plasma with a power of 15 kw., in three layers, according to Example 13. The only variation was that the thickness of the third ZrO₂ layer had been increased to 1.75 mm.

Testing of the mechanical resistance of the coating in homogeneous hearing conditions in a muffle at 1000° C.

After the application of the protective treatment, the ring was placed into a muffle, in air atmosphere, at a temperature of 1000° C., and kept there for 150 hours. After extraction from the muffle, it was observed that the coating had not suffered any mechanical damage (such as cracks, scalings, or partial or total detachment) remaining perfectly anchored to the base metal which, consequently was efficaciously protected.

Results

Positive, with suitability of the applied treatment to form a heat barrier as well as an antioxidant barrier with evident mechanical resistance to the stresses due to thermal expansion of the Incoloy-DS base metal.

EXAMPLE 15

Application of protective treatment

To the inner surface of a Rheinrohr-TSL iron ring of the dimensions 95 mm. diameter; 40 mm. high and 3 mm. thick, after a previous sandblasting by a spray gun with plasma jet, operated with argon plasma with a power of 15 kw., treatment No. 19 was applied with four layers, of which:

The first layer (simple) of a thickness of about 0.2 mm. was obtained using the powder of the nickle-chromium-iron-boron-silicon alloy (having the composition given in the Examples 1–2) having a granulometry comprised between —120 and +325 mesh (—125/+40µ); the second layer (composite binary) of a thickness of about 0.2 mm.; the third layer (simple) layer of a thickness of about 0.2 mm. and the fourth layer (simple) of a thickness of about 1.25 mm. were, respectively, obtained as the first, second and third layers of Example 13.

Testing of the mechanical resistance of the coating under homogeneous heating conditions in a muffle at 1000° C.

After the application of the protective treatment, the ring has been put into a muffle, in air atmosphere, at a temperature of 1000° C., and kept there for 100 hours. After extraction from the muffle, it was observed that the coating had not suffered any mechanical damage (such as cracks, scalings, or partial or total detachment) ramaining perfectly anchored to the base metal which, consequently, was efficaciously protected. The outer non-protected part, however, showed a considerable corrosion by heat oxidation.

Result

Positive, with suitability of the treatment applied to form a heat barrier as well as an antioxidant barrier with evident mechanical resistance to the stresses due to thermal expansion of Rheinrohr-TSL iron base material.

EXAMPLE 16

Application of protective treatment

To one side of a flat, rectangular iron test piece of 50 x 50 x 4 mm., after preliminary sandblasting treatment, the spray technique carried out with the use of a spray gun with plasma jet, operated with argon plasma, with a power of 15 kw., treatment No. 19, with four layers was applied of which:

The first (simple) layer of a thickness of about 0.2 mm. has been obtained as in Example 15; the second (composite binary) layer of a thickness of about 0.15 mm., was obtained as the first layer of Example 13; the third (simple) one of a thickness of about 0.15 mm. was obtained using only chromium powder, having a granulometry comprised between —230 and +270 mesh (—63/+50µ); the fourth (simple) one of a thickness of about 0.6 mm. was obtained using only ZrO₂ powder (stabilized with about 5% of CaO) in a granulometric fraction totally passing through a sieve of 200 mesh ($\leq$75µ).

In each case, the powders have been injected into the plasma spout by means of transport by nitrogen blowing.

Testing of the mechanical resistance of the coating in homogeneous heating conditions in a muffle at 1000° C.

After the application of the protective treatment the flat, rectangular test piece has been put into a muffle, in air atmosphere, at a temperature of 1000° C. and kept there for 100 hours. After extraction from the muffle, it was observed that the coating had not suffered any mechanical damage (such as cracks, scalings, or partial or total detachment), remaining perfectly anchored to the base metal which, consequently, resulted in an efficacious coating. The non-protected part, however, showed a considerable corrosion by heat oxidation.

Result

Positive, with suitability of the applied treatment to form a heat barrier as well as an antioxidant barrier with evident mechanical resistance to stresses due to thermal expansion of the iron base metal.

EXAMPLE 17

Application of protective treatment

Treatment No. 19 as applied in Example 16 was applied to one side of a flat, rectangular Rheinrohr-TSL iron test piece of the dimensions 60 x 50 x 4 mm., after preliminary sandblasting, by means of a spray gun with plasma jet, operated with argon plasma with a power of 15 kw.

Testing of the mechanical resistance of the coating under homogeneous heating conditions in a muffle at 1000° C.

After the application of the protective treatment the flat, rectangular test piece has been put into a muffle in air atmosphere, at a temperature of 1000° C., and kept there for 100 hours.

After extraction from the muffle furnace it was observed that the coating had not suffered any mechanical damage (such as cracks, scalings, or partial or total detachment), remaining perfectly anchored to the base metal which, consequently, was efficaciously protected. The non-protected part, however, showed a considerable corrosion by heat oxidation.

Result

Positive, with suitability of the treatment applied to form a heat barrier as well as an antioxidant barrier with evident mechanical resistance of the Rheinrohr-TSL iron base metal to the stresses due to thermal expansion.

TABLES 1–4.—COMPOSITION CHARACTERISTICS OF PROTECTIVE TREATMENTS WITH ONE OR MORE LAYERS

| | Layer | Powders of the components or of their mixtures, employed for obtaining the layer in consideration |
|---|---|---|
| Protective treatment with: | | |
| 1 layer | I | t.m., ABC. |
| 2 layers | I | A or b.m., AB or t.m., ABC. |
| | II | C or b.m., BC or t.m., ABC. |
| 3 layers | I | A or b.m., AB or t.m., ABC. |
| | II | B or bm., AB or b.m., BC or t.m., ABC. |
| | III | C or b.m., BC. |
| 4 layers | I | A. |
| | II | B or b.m., AB or t.m., ABC. |
| | III | B or b.m., BC. |
| | IV | C. |

NOTE.—A=metal alloy; B=refractory metal; C=simple or composite ceramic oxide; b.m.=binary mixture of the components in powder form; t.m.=ternary mixture of the components in powder form.

| Example Number | Character of the coating | Type of test | Duration of the test | Result |
|---|---|---|---|---|
| 1 | Antioxidant Barrier | 1 | 150 hours | Positive. |
| 2 | do | 1 | do | Do. |
| 3 | do | 1 | 120 hours | Do. |
| 4 | do | 1 | 100 hours | Do. |
| 5 | Heat and antioxidant Barrier | 1 | 300 hours | Do. |
| 6 | do | 1 | do | Do. |
| 7 | do | 2 | 10 cycles | Do. |
| 8 | do | 1 | 300 hours | Do. |
| 9 | do | 2 | 20 cycles | Do. |
| 10 | do | 2 | do | Do. |
| 11 | do | 3 | 14 testings | Do. |
| 12 | do | 4 | 6 hours | Do. |
| 13 | do | 5 | 100 hours | Do. |
| 14 | do | 5 | 150 hours | Do. |
| 15 | do | 5 | 100 hours | Do. |
| 16 | do | 5 | do | Do. |
| 17 | do | 5 | do | Do. |

NOTE.—1=testing of the resistance to heat oxidation under homogeneous heating conditions in a muffle at 800° C.; 2=testing of the mechanical resistance of the coating under conditions of facial thermal shock 3=testing of the resistance to fusion in one point under conditions of localized overheating; 4=testing of the mechanical resistance of the coating under conditions of thermal shock by alternately starting and stopping industrial plants; 5=testing of the mechanical resistance of the coating under homogeneous heating conditions in a muffle at 1,000° C.

SUMMARY OF THE THICKNESS (FIELD VALUE AND PREFERENTIAL VALUE) OF THE VARIOUS LAYERS OF WHICH THE 23 EXEMPLIFIED TREATMENTS CONSIST

| Treatment Number | Layer consisting of— | Thickness Interval | Preferred |
|---|---|---|---|
| 2 | A | 0.05–0.3 | 0.15 |
| 3 | A | 0.05–0.3 | 0.15 |
| 8 | A | 0.05–0.3 | 0.15 |
| 9 | A | 0.05–0.3 | 0.10 |
| 10 | A | 0.05–0.3 | 0.10 |
| 11 | A | 0.05–0.3 | 0.15 |
| 12 | A | 0.05–0.3 | 0.10 |
| 13 | A | 0.05–0.3 | 0.15 |
| 18 | A | 0.05–0.3 | 0.15 |
| 19 | A | 0.05–0.3 | 0.15 |
| 20 | A | 0.05–0.3 | 0.15 |
| 21 | A | 0.05–0.3 | 0.15 |
| 22 | A | 0.05–0.3 | 0.15 |
| 23 | A | 0.05–0.3 | 0.15 |
| 8 | B | 0.05–1.0 | 0.25 |
| 14 | B | 0.05–1.0 | 0.20 |
| 16 | B | 0.05–1.0 | 0.25 |
| 18 | B | 0.05–1.0 | 0.15 |
| 23 | B | 0.05–1.0 | 0.20 |
| 19 | B | 0.05–1.0 | 0.20 |
| 21 | B / C | 0.05–1.0 / 0.05–2.5 | 0.15 |
| 4 | AB | 0.05–0.4 | 0.15 |
| 5 | AB | 0.05–0.4 | 0.30 |
| 14 | AB | 0.05–0.4 | 0.20 |
| 15 | AB | 0.05–0.4 | 0.20 |
| 9 | AB | 0.05–0.4 | 0.10 |
| 10 | AB | 0.05–0.4 | 0.30 |
| 19 | AB | 0.05–0.4 | 0.10 |
| 20 | AB | 0.05–0.4 | 0.15 |
| 1 | ABC | 0.05–0.5 | 0.2 |
| 6 | ABC | 0.05–0.3 | 0.20 |
| 7 | ABC | 0.05–0.5 | 0.30 |
| 3 | ABC | 0.05–0.5 | 0.20 |
| 16 | ABC | 0.05–0.5 | 0.25 |
| 17 | ABC | 0.05–0.5 | 0.20 |
| 12 | ABC | 0.05–0.5 | 0.35 |
| 13 | ABC | 0.05–0.4 | 0.15 |
| 21 | ABC | 0.05–0.4 | 0.15 |
| 22 | ABC | 0.05–0.5 | 0.20 |
| 2 | BC | 0.05–0.5 | 0.20 |
| 4 | BC | 0.05–0.5 | 0.20 |
| 6 | BC | 0.05–0.5 | 0.25 |
| 11 | BC | 0.05–0.5 | 0.25 |
| 15 | BC | 0.05–0.5 | 0.20 |
| 17 | BC | 0.05–0.5 | 0.15 |
| 9 | BC | 0.05–0.5 | 0.20 |
| 12 | BC | 0.05–0.5 | 0.15 |
| 18 | BC | 0.05–0.5 | 0.20 |
| 20 | BC | 0.05–0.5 | 0.20 |
| 22 | BC | 0.05–0.5 | 0.20 |
| 23 | BC | 0.05–0.5 | 0.20 |

NOTE.—A=metal alloy of the type for strong brazing (preferably nickel-chromium-iron-boron-silicon having a composition between the values: 0.4–1.0% of C; 0.9–5.0% of Fe; 2.1–4.4% of Si; 1.9–4.1% of B; 9.0–27.0% of Cr; the rest up to 100% consisting of Ni together with occasional other metals in very small quantities), having a melting point between 800 and 1,350° C. (preferably comprised bwtween 1,040–1,100° C.); B=refractory metal having a melting point not lower than 1,800° C., as represented by chromium; C=ceramic oxide having a melting point not lower than 1,900° C., both of the simple type ($Al_2O_3$-type $\alpha$; stabilized $ZrO_2$, $ThO_2$; MgO) and of the composite type (spinel $MgOAl_2O_3$; calcium zirconate $CaZrO_3$; zirconium silicate $ZrSiO_4$), preferably $ZrO_2$ or $Al_2O_3$ for the first and calcium zirconate for the second type.

The intervals define the field of the practicable thicknesses; the preferential thicknesses concern the treatments carried out on inner cylindrical surfaces.

For outer cylindrical surfaces or for flat surfaces, the preferential value reported is to be reduced by one to two-thirds. For convex surfaces, the preferential value reported will have to be reduced by three quarters. For inner cylindrical surfaces treated with a "heavy heat barrier" (with a considerable thickness of the last layer of component C), the preferential value reported can usefully be increased by one or also two thirds; this becomes a requirement when the base metal is characterized by considerable expansion coeffiicents. This consideration also concerns flat surfaces.

The choice of the value of the thickness of the last layer of component C falls into the field indicated and will be influenced towards the minima or towards the maxima depending upon the necessity to realize heat barriers with low, medium or high insulating power (light, medium, heavy barriers, respectively).

It is understood that components AB and C can be used in powder, wire, and sintered rod form and claims are to be so interpreted where the term "powder" is used, except where a particular granulometry is specified.

What is claimed is:

1. Protective treatment as antioxidant barrier and as heat barrier for ferrous and non-ferrous metallic surfaces, which comprises spray depositing in molten state a combination of powders of three components consisting of a metal alloy A, a metal B, and a ceramic oxide C onto the base surface, the metal alloy A having a melting point between 800 and 1350° C. and being selected from the group of alloys for strong brazing consisting of copper-zinc, copper-nickel, copper-zinc-nickel, nickel-chromium and nickel-chromium-iron-boron-silicon-carbon with nickel being the main component, the metal B being chromium and the ceramic oxide C having a melting point not lower than 1900° C. and being selected from the group consisting of the simple oxides MgO, $Al_2O_3$-$\alpha$, $ZrO_2$ stabilized in the cubic form, $ThO_2$ and of the composite oxides $MgOAl_2O_3$, $CaZrO_3$ and $ZrSiO_4$, so that the generated coating includes three different layers and contains all three components A, B and C, wherein:

(a) the first layer, adhering to the base metal surface, is produced from component A or binary mixture AB or ternary mixture ABC;

(b) the second layer is produced from component B or binary mixture AB or binary mixture BC or ternary mixture ABC; and (c) the third layer is produced from component C or binary mixture BC.

2. Protective treatment as antioxidant barrier and as heat barrier for ferrous and non-ferrous metallic surfaces, which comprises spray depositing in molten state a combination of powders of three components consisting of a metal alloy A, a metal B and a ceramic oxide C onto the base surface, the metal alloy A having a melting point between 800 and 1350° C. and being selected from the group of alloys for strong brazing consisting of copper-zinc, copper-nickel, copper-zinc-nickel, nickel-chromium and nickel-chromium-iron-boron-solicon-carbon with nickel being the main component, the metal B being chromium and the ceramic oxide C having a melting point now lower than 1900° C. and being selected from the group consisting of the simple oxides MgO, $Al_2O_3$-$\alpha$, ZrO stabilized in the cubic form, $ThO_2$ and of the composite oxides $MgOAl_2O_3$, $CaZrO_3$ and $ZrSiO_4$, so that the generated coating includes four different layers and contains all three components A, B and C, wherein:

(a) the first layer, adhering to the base metal surface, is produced from component A;

(b) the second layer is produced from component B or binary mixture AB or ternary mixture ABC;

(c) the third layer is produced from component B or binary mixture BC; and (d) the fourth layer is produced from component C so that the composition of each layer is different from the composition of the preceding layer and of the subsequent layer.

3. Protective treatment according to claim 1, wherein the nickel-chromium-iron-boron-silicon-carbon alloy has the composition of 0.4–1.0% of C, 0.9–5.0% of Fe, 2.1–4.4% of Si, 1.9–4.1% of B, 9.0–27.0% of Cr, the remainder up to 100% consisting essentially of nickel, the alloy having a melting point of about 1040–1100° C.

4. Protective treatment according to claim 2, wherein the nickel-chromium-iron-boron-silicon-carbon alloy has the composition of 0.4–1.0% of C, 0.9–5.0% of Fe, 2.1–4.4% of Si, 1.9–4.1% of B, 9.0–27.0% of Cr, the remainder up to 100% consisting essentially of nickel, the alloy having a melting point of about 1040–1100° C.

5. Protective treatment according to claim 1, wherein the ceramic oxide is $ZrO_2$ stabilized in cubic form or $Al_2O_3$-$\alpha$.

6. Protective treatment according to claim 2, wherein the ceramic oxide is $ZrO_2$ stabilized in cubic form or $Al_2O_3$-$\alpha$.

7. Protective treatment according to claim 1, wherein the binary mixtures AB have a composition comprised between 40–90% by weight for B.

8. Protective treatment according to claim 1, wherein the binary mixtures BC have a composition comprised between 30–70% for B and between 70–30% for C, by weight.

9. Protective treatment according to claim 1, wherein the ternary mixtures ABC have a composition comprised between 60–10% for A, between 20–60% for B, between 20–30% for C, by weight.

10. Protective treatment according to claim 1, wherein the powders of the components are employed in a granulometric composition between −230 and +325 mesh.

11. Protective treatment according to claim 1, wherein the powders of the components are employed in a granulometric composition between −120 and +600 mesh.

12. Protective treatment according to claim 10, wherein the thickness of layers is of 0.05–0.2 mm. for the layer produced from individual component A; 0.05–1.0 mm. for the layer produced from individual component B; 0.05–1.0 mm. for the layer produced from individual component C; 0.05–0.4 mm. for the layer produced from the binary mixture AB; 0.05–0.5 mm. for the layer produced from the binary mixture BC; and 0.05–0.5 mm. for the layer produced from the ternary mixture ABC.

13. Protective treatment according to claim 12, wherein the thickness of the layers is 0.1 mm. for that produced from individual component A; 0.15 mm. for that produced from individual component B; 0.15 mm. for the layer produced from binary mixture AB; 0.25 mm. for the layer produced from the binary mixture BC, and 0.2 mm. for the layer produced from ternary mixture ABC.

14. Protective treatment according to claim 1, wherein the last layer consisting of the individual component C is produced from stratified films of $Al_2O_3$ and $ZrO_2$.

15. The process whereby the protective treatment of claim 1 is applied to ferrous and non-ferrous metallic surfaces as an antioxidant barrier and a heat barrier.

16. The process of claim 15, wherein the protective treatment is applied to a metal selected from iron, brass, aluminum, and alloyed steel.

17. The process of claim 15, wherein the protective treatment is applied to inner surfaces, in contact with flames, of metallic elements forming the reactor of petrochemical plants for the production of acetylene by the cracking of hydrocarbons, for insulation and protection with high resistance against the damages caused by heat oxidation and heat carburizing.

18. An acetylene reactor, wherein the inner surface, which during reaction, is in contact with flames, has thereon an antioxidant and heat barrier multi-layer: the first layer, adhering to the base metal surface, is produced from component A or binary mixture AB or ternary mixture ABC; the second layer is produced from component B or binary mixture AB or binary mixture BC or ternary mixture ABC; and the third layer is produced from component C or binary mixture BC, the component A being a metal alloy having a melting point between 800 and 1350° C. and being selected from the group of alloys for strong brazing consisting of copper-zinc, copper-nickel, copper-zinc-nickel, nickel-chromium and nickel-chromium-iron-boron-silicon-carbon with nickel being the main component, the component B being chromium and the component C being a ceramic oxide having a melting point not lower than 1900° C. and being selected from the group consisting of the simple oxides MgO, $Al_2O_3$-$\alpha$, $ZrO_2$ stabilized in the cubic form, $ThO_2$ and of the composite oxides $MgOAl_2O_3$, $CaZrO_3$ and $ZrSiO_4$.

References Cited

UNITED STATES PATENTS

| | | | |
|---|---|---|---|
| 2,300,400 | 11/1942 | Axline | 117—71 M |
| 2,775,531 | 12/1956 | Montgomery et al. | 117—105 X |
| 2,904,449 | 9/1959 | Bradstreet | 117—105.2 |
| 3,006,782 | 10/1961 | Wheildon, Jr. | 117—105 X |
| 3,010,480 | 11/1961 | Ragsdale | 117—71 M X |
| 3,054,694 | 9/1962 | Aves, Jr. | 117—71 M X |
| 3,084,064 | 4/1963 | Cowden et al. | 117—105 X |
| 3,091,548 | 5/1963 | Dillon II | 117—71 M X |
| 3,110,571 | 11/1963 | Alexander | 117—22 X |
| 3,279,939 | 10/1966 | Yenni | 117—93.1 P F |
| 3,378,392 | 4/1968 | Longo | 117—93.1 P F |

ALFRED L. LEAVITT, Primary Examiner

J. R. BATTEN, Jr., Assistant Examiner

U.S. Cl. X.R.

23—252 A, 277 R, 284; 29—195; 117—69, 93.1 PF, 97, 105, 105.2, 127, 131